(12) United States Patent
Sasaki et al.

(10) Patent No.: US 12,169,533 B2
(45) Date of Patent: Dec. 17, 2024

(54) INFORMATION PROCESSING SYSTEM

(71) Applicant: LegalTech, Inc., Tokyo (JP)

(72) Inventors: Takamasa Sasaki, Tokyo (JP); Daisuke Shida, Tokyo (JP)

(73) Assignee: LegalTech, Inc., Tokyo (JP)

( * ) Notice: Subject to any disclaimer, the term of this patent is extended or adjusted under 35 U.S.C. 154(b) by 0 days.

(21) Appl. No.: 17/790,104

(22) PCT Filed: Jan. 28, 2021

(86) PCT No.: PCT/JP2021/003057
§ 371 (c)(1),
(2) Date: Jun. 29, 2022

(87) PCT Pub. No.: WO2021/153676
PCT Pub. Date: Aug. 5, 2021

(65) Prior Publication Data
US 2023/0043549 A1    Feb. 9, 2023

(30) Foreign Application Priority Data
Jan. 31, 2020   (JP) .................. 2020-015033

(51) Int. Cl.
*G06F 16/957*    (2019.01)
*G06F 16/958*    (2019.01)
*G06F 17/00*    (2019.01)

(52) U.S. Cl.
CPC ........ *G06F 16/9577* (2019.01); *G06F 16/958* (2019.01)

(58) Field of Classification Search
CPC ........................... G06F 16/9577; G06F 16/958
(Continued)

(56) References Cited

U.S. PATENT DOCUMENTS 7,593,928 B2 *   9/2009  Canon ................. G06F 16/9577
                                                  707/999.005
7,827,170 B1 *  11/2010  Horling .................. G06F 16/93
                                                        707/722
(Continued)

FOREIGN PATENT DOCUMENTS

JP    2009-157500 A    7/2009
JP    2011-022870 A    2/2011
(Continued)

OTHER PUBLICATIONS

Babich Nick, Best Practices for Search, Published May 2, 2017 via UX BOOTH, pp. 1-28 (pdf).*
(Continued)

*Primary Examiner* — Manglesh M Patel
(74) *Attorney, Agent, or Firm* — SoCal IP Law Group LLP; Mark Andrew Goldstein (57) ABSTRACT

A site reception unit receives designation of a web site where a search window for searching for data existing in a prescribed data pool is to be displayed. A page reception unit receives designation of one or more web pages for displaying the search window among one or more web pages constituting the web site the destination of which has been received. A search window position reception unit receives destination of a position for displaying the search window for each web page the destination of which has been received. A construction unit constructs the web site so as to display the search window at the designated position for a user who has accessed the web site.

6 Claims, 5 Drawing Sheets

(58) Field of Classification Search
USPC .................................................. 715/234, 200
See application file for complete search history.

(56) References Cited

U.S. PATENT DOCUMENTS

| | | | | |
|---|---|---|---|---|
| 8,909,619 | B1* | 12/2014 | Riley | G06F 16/957 |
| | | | | 707/722 |
| 10,685,080 | B2* | 6/2020 | Koren | G06Q 10/101 |
| 11,314,837 | B2* | 4/2022 | Aviyam | G06F 16/24578 |
| 11,321,422 | B1* | 5/2022 | Stone | G06F 3/0486 |
| 11,392,598 | B2* | 7/2022 | Hewavitharana | G06F 16/23 |
| 2002/0156757 | A1* | 10/2002 | Brown | G06Q 10/06 |
| 2007/0219955 | A1* | 9/2007 | Li | G06Q 30/02 |
| 2007/0299986 | A1* | 12/2007 | Craig | H04L 61/30 |
| | | | | 707/E17.116 |
| 2008/0077556 | A1* | 3/2008 | Muriente | G06F 16/951 |
| 2010/0082604 | A1* | 4/2010 | Gutt | G06F 16/3326 |
| | | | | 707/E17.014 |
| 2011/0054960 | A1* | 3/2011 | Bhatia | G06F 16/958 |
| | | | | 715/243 |
| 2013/0339334 | A1* | 12/2013 | Brown | G06F 16/9535 |
| | | | | 707/706 |
| 2015/0154493 | A1* | 6/2015 | Yagnik | G06F 16/437 |
| | | | | 706/14 |
| 2015/0324434 | A1* | 11/2015 | Greenwood | G06F 16/951 |
| | | | | 707/722 |
| 2018/0260491 | A1* | 9/2018 | Gururaj | G06F 16/128 |
| 2020/0257437 | A1* | 8/2020 | Fitzpatrick | G06F 3/0486 |

FOREIGN PATENT DOCUMENTS

| | | |
|---|---|---|
| JP | 2011-248800 A | 12/2011 |
| JP | 2017-207847 A | 11/2017 |

OTHER PUBLICATIONS

Mockplus, 20 Creative Search bar Design Inspirations with HTML/CSS/Bootstrap, published Dec. 10, 2018 waybackmachine, pp. 1-26 (pdf).*
Japan Patent Office, International Search Report and Written Opinion for PCT Application No. PCT/JP2021/003057, mail date May 11, 2021.
Search function on a website with a high performance for free. (Online), May 24, 2018 [search date : Oct. 6, 2021], Internet : < URL:https://ferret-plus.com/7838?page=2 > (documents showing well-known arts) 05.
Yamamoto Yuji, Retrieval Systems, Toshiba Technology Bulletin, Japan, Toshiba Corporation, Apr. 25, 2002, vol. 20-21, pp. 9-18.
Japan Intellectual Property Office, Notification of Reasons for Refusal issued in Japanese Patent Application No. 2022-054195, mailed on Mar. 12, 2024.

* cited by examiner

INFORMATION PROCESSING SYSTEM

RELATED APPLICATION INFORMATION

This patent claims priority from International PCT Patent Application No. PCT/JP2021/003057, filed Jan. 28, 2021, entitled, "INFORMATION PROCESSING SYSTEM", which claims priority to Japanese Patent Application No. 2020-015033, filed Jan. 31, 2020, all of which are incorporated herein by reference in their entirety.

BACKGROUND

Technical Field

The present invention relates to an information processing system.

Background Art

Conventionally, there has been a technology for enabling users to create Web sites efficiently (see Patent Document 1, for example).
Patent Document 1: Japanese Unexamined Patent Application, Publication No. 2017-207847

SUMMARY OF THE INVENTION

Problems to be Solved by the Invention

However, it is desired to be able to create Web sites that are more convenient for the users than the case of the conventional technology, including the technology of Patent Document 1.

The present invention is designed in view of the foregoing circumstance, and it is an object thereof to enable creation of Web sites that are still more convenient for the users.

Means for Solving the Problems

In order to achieve the foregoing object, an information processing system according to one aspect of the present invention includes:
first reception unit that receives designation of a target web site where a search window for searching for data existing in a prescribed data pool is to be displayed;
second reception unit that receives designation of one or more target web pages for displaying the search window among one or more web pages constituting the web site the designation of which is received;
third reception unit that receives designation of a position for displaying the search window for each of the one or more web pages the designation of which is received; and construction unit that constructs the web site such that the search window is displayed at the position for a person accessing the web site.

Effects of the Invention

According to the present invention, it is possible to create a Web site that is still more convenient for the user.

DETAILED DESCRIPTION OF THE PREFERRED CARRYING OUT OF THE INVENTION

An embodiment of the present invention will be described below with reference to the accompanying drawings.

First, by referring to FIGS. 1 and 2, an overview of a service (referred to as "present service" hereinafter) to which an information processing system (see FIG. 3 to be described later) of the present invention is applied will be described.

Figure 1:
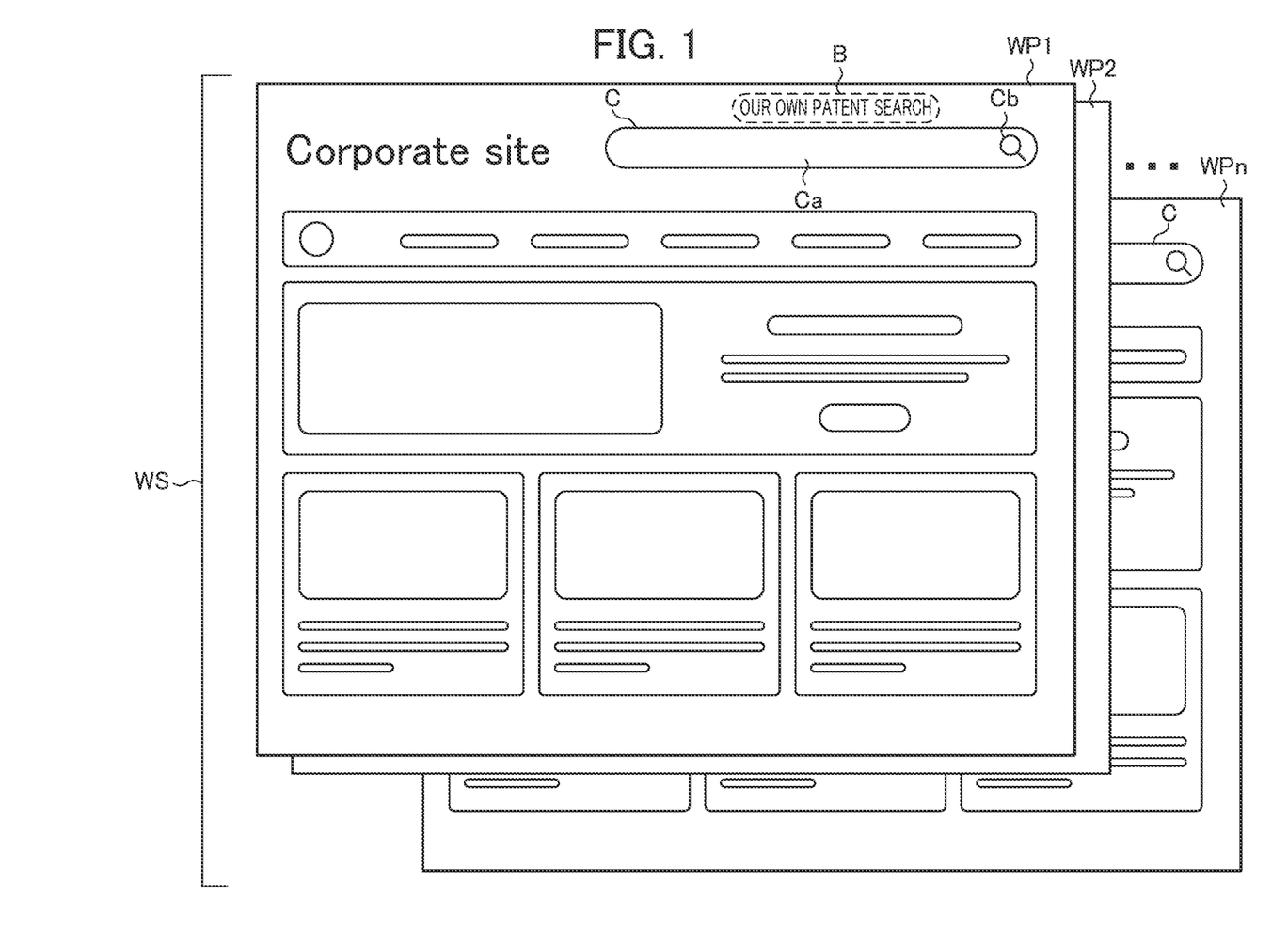
FIG. 1 is a diagram illustrating an overview of a present service to which an information processing system of the present invention is applied.

FIG. 1 is a diagram illustrating an overview of the present service to which the information processing system of the present invention is applied.

The content of a web site WS illustrated in FIG. 1 is managed by a user corporation U. While there is no specific limit set for the creator of the web site, the present embodiment will be described on an assumption that the user corporation U is the creator. The web site WS is constituted by n-pieces (n is an integer of 1 or more) of web pages WP1 to WPn. Hereinafter, when it is unnecessary to distinguish between the web pages WP1 to WPn, they are collectively referred to as "web page(s) WP". In the web site WS whose content is managed by the user corporation U (for example, the own company site of the user corporation U), the present service supports provision of a search window C allowing information search in niche fields, at a desired position on a desired web page WP for the user corporation U. Note that the creator of the web site WS and the method of crating the web site WS are not specifically limited. However, in order to facilitate the understanding of the present invention and for convenience of explanation, the present embodiment will be described on the assumption that the creator is the user corporation U and the creation method is a method using, for example, web site creation software generally available on the market.

There may be a case where the web pages WP1 to WPn constituting the web site WS are provided with the search window C that allows viewers of the web pages WP to conduct a keyword search in niche fields. Here, note that "keyword search in niche fields" is different from typical search windows targeted at the search in wide fields, such as search windows of Google (Registered Trademark), Yahoo! (Registered Trademark). For example, patent search targeted at searching a specific niche field such as "patent document" is an example of "keyword search in niche fields". It is mentioned above that there "may be a case" where the search window C is provided. This means that whether to provide the search window C can be determined by the user corporation U as desired. The search window C is constituted by: a keyword input field Ca for receiving input of characters and numerals to be a search keyword; and a search start button Cb that is pressed when a search is executed based on the search keyword input to the keyword input field Ca. That is, when a prescribed search keyword is input to the keyword input field Ca and the search start button Cb is pressed, a search result is displayed on a web page (not shown) or the like. The notable point herein is that the search result is not the general media such as web sites, sentences of wide fields including the "prescribed search keyword". Specifically, it is to be noted that in the case of the above-described patent search, patent documents are the media regarding the "prescribed search keyword" searched within the range of the niche field, and are displayed as the search result.

As described above, the user corporation U can provide the search window C at an arbitrary position on an arbitrary web page WP among the web pages WP1 to WPn constituting the web site WS. For example, the search window C may be provided by specifically targeting the web page WP that is expected to be viewed by those who wish to search a specific niche field such as "patent documents" from the very beginning of the access to the web site WS.

For example, a case where the user corporation U is a patent firm A and the search window C is provided on the web site WS of the patent firm A will be described as a specific example. In this case, the patent firm A speculates on what purpose those who access the web site WS do so. Then, based on the speculation result, the patent firm A designates the web page WP where the search window C is to be provided and a specific position for displaying the search window C. The patent firm A can speculate that those who access the web site WS intend to acquire information on the technical fields of expertise of the patent firm A is specialized and information regarding the patent attorneys and the like belonging to the patent firm A, for example. Accordingly, the patent firm A provides the search window C at a prescribed position on the web page WP where the search window C is assumed to be naturally or actively used by those who are speculated to access.

Note here that the patent firm A speculates on "employees of a startup company that is planning to file an application for a new business model patent" (referred to as "startup employees" hereinafter), for example, as those who may access the web site WS. In this case, as the web page WP where the search window C is to be provided, the patent firm A designates the web page WP having a label "Technical fields of our expertise" displayed on the top thereof, for example, which may possibly be viewed by the startup employees. Furthermore, the patent firm A designates a prescribed position in the vicinity of the label the startup employee may easily recognize, as the position for displaying the search window C. It is assumed here that the patent firm A designates "publications of all patent applications handled by the patent attorneys belonging to the patent firm A as the agent" as a range of data that can be searched via the search window C whose position is being designated. In this case, the following effect is expected, for example, when the startup employees speculated to access actually do so. That is, as compared with conventional web sites WS with which the web page where the search window C is to be provided and the position thereof cannot be designated, it is expected that a greater number of startup employees are encouraged to naturally or actively use the search window C.

Note here that the patent firm A speculates that those who access the web site WS are, for example, "those who try to acquire information regarding the patent attorneys specialized in filing an application for a business model patent" (referred to as "patent attorney information interested party" hereinafter). In this case, as the web page WP where the search window C is to be provided, the patent firm A designates the web page WP having a label such as "members of our firm" on the top part thereof, for example, which may possibly be viewed by the patent attorney information interested party. Furthermore, the patent firm A designates, as the position for displaying the search window C, a prescribed position in the vicinity of the label considered to be easily recognized by the patent attorney information interested party. Furthermore, as the range of data that can be searched via the search window C whose display position is being designated, the patent firm A designates "information regarding all patent attorneys belonging to the patent firm A". Accordingly, when the patent attorney information interested party speculated to access actually does so, the following effects can be expected, for example. That is, as compared with the conventional web site WS with which the web page where the search window C is to be provided and the position thereof cannot be designated, it is expected that a greater number of patent attorney information interested parties can naturally and actively use the search window C. Furthermore, for example, the user corporation U can provide the search window C at an arbitrary position of the web page WP such that the viewer is encouraged to search a niche field upon recognizing the search window C, even if the viewer does not intend to search such a niche field at the time of the access. Furthermore, for example, among a plurality of the web pages WP constituting the web site WS, the user corporation U can also select the web page with relatively a large number of page views and dispose the search window C there. Accordingly, the search window C catches many viewer's eyes, so that the use frequency of the search window C is expected to increase. As a result, it is also expected to increase the number of accesses to the web site where the search window C is provided.

Furthermore, when it starts to be generally recognized that the number of accesses fluctuates depending on the presence or absence of the search window C and the position of the search window C, the existence value of the search window C itself is expected to increase gradually. That is, as for the conventional search window, which can be dented as a fixed search window, it is considered important what kind of search keywords can be input and what kind of search results are to be output based thereupon. In contrast, the search window C of the present service, which can be denoted as a movable search window, can be used as a tool for increasing the number of accesses to the web site WS (that is, a tool for sales promotion). That is, the present service can be considered as an epoch-making service that finds new usages (utility values) of the search window. Even in the case of a web site WS with a small number of accesses, the present service makes it possible to increase the number of accesses by providing the search window C that is easy to handle and highly convenient.

Furthermore, according to the present service, the search keywords input to the search window C and the search results are recorded as history information. The recorded history information is placed under management of the user corporation U that has set the search window C. In the case of a conventional typical search window such as Google (Registered Trademark), the history information of the search keywords is placed under management of the provider of the search window (Google (Registered Trademark), for example) and handling thereof is dominated. In contrast, according to the present service, the history information of the search keywords is placed under management of the patent firm A that has set the search window C as described above. Therefore, the patent firm A can dominate handling of the history information of the search keywords of an employee b of a company B that has used the search window C. In other words, it becomes possible to release and democratize the history information. Furthermore, the user who inputs the search keywords to the search window C can determine whether to record the history of the search keywords input to the search window C as the history information. When the user who inputs the search keywords to the search window C refuses to record them as the history information, the history information is managed so as to be excluded from the target of recording.

Specifically, for example, a case is assumed in which the employee b of the company B accesses the web site (web site WS) of the patent firm A where the search window C is provided. In this case, following functions and effects can be achieved. That is, it is assumed that the employee b of the company B accessing the web site of the patent firm A conducted a search with a search keyword "patent survey" by using the search window C. Upon that, the information indicating the search keyword "patent survey" is placed under management of the patent firm A as the history information. The patent firm A can grasp the interest of the employee b of the company B by analyzing the history information. While only one search keyword "patent survey" is used in this example, when searches are conducted by a plurality of search keywords, all of those search keywords are recorded as the history information and placed under management of the patent firm A.

Consequently, even at a stage where any inquiry has no yet been received from the company B, the patent firm A can make various kinds of proposals and the like for the company B based on the tendency of the interest of the employee b grasped by analyzing the history information of the search keywords. Specifically, for example, it is possible to send a direct email saying "we are specialized in service for patent survey" to the company B even at the stage where there is no inquiry received from the company B yet. As a result, the patent firm A can expect such an effect that it increases the chance of receiving new orders. Furthermore, for example, in a case where the company B is an existing client of the patent firm A, the issues of the company B as the client can be grasped in advance. As a result, the patent firm A can easily prepare for taking appropriate measures and make new proposals.

Furthermore, for example, when it is found as a result of analyzing the history information of the search keywords that the tendency of the interest of the employee b falls outside the range of the services of the patent firm A, the patent firm A may contact a partner company C that may be capable of handling it for matching. In this case, if the partner company C of the patent firm A is the user corporation U that uses the present service, the company C may conversely find the match for the patent firm A. Specifically, there may be a case where the history information of the search keywords under management of the company C includes a service that is outside the range of the services of the company C but within the range of the services of the patent firm A. In this case, the company C may find the match for the patent firm A. This enables the patent firm A to build a good relationship with the company C.

Furthermore, for example, when the search keywords input to the search window C by the employee b of the company B are under management of the patent firm A as the history information, there may be a case where the same or similar search keywords are input by another user (an employee c of the company B). In this case, a message such as "the employee b of the company B has conducted a similar search", is given to that user (the employee c of the company B). This enables the employee c of the company B to ask for an advice and cooperate with the employee b of the company B, thereby making it possible to efficiently proceed with the work by avoiding duplicated work and the like. Furthermore, under conditions that there is a mutual agreement between the employee b and the employee c of the company B, it is possible to share the history information of the search keywords and the search results of both.

Furthermore, for example, causing AI (Artificial Intelligence) to learn the history information of the search keywords makes it possible to rank the search skills (to search well or not) of the users of the search window C. The result of ranking may also be used for personnel evaluation or the like within the company. Furthermore, the history information of the search keywords and the search results of those using the search window C may be open to the public or may be distributed to the human resources market. As a result, those who are highly skilled at searching may be linked to, for example, recruitment services targeted to such persons.

Figure 2:
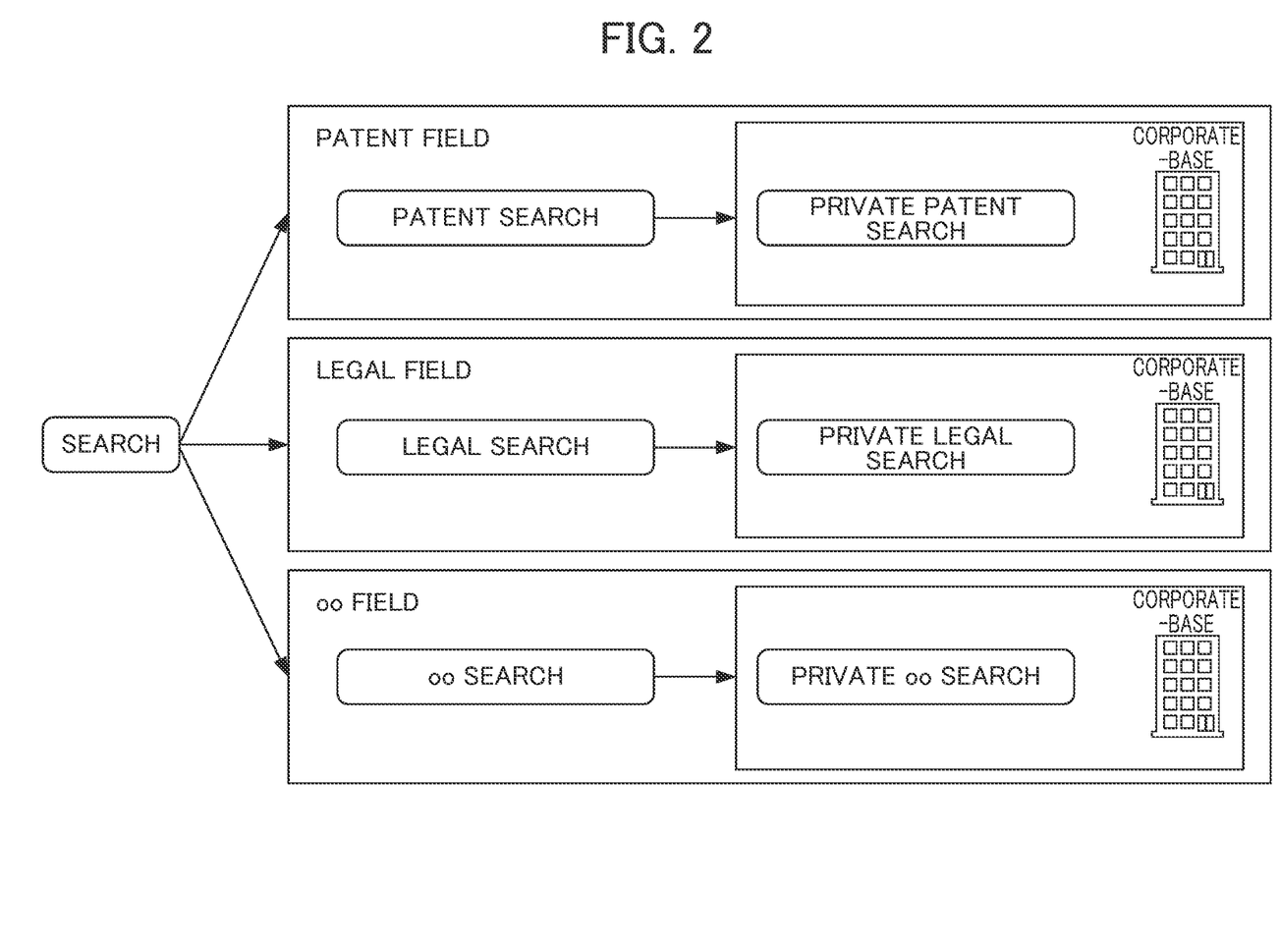
FIG. 2 is a diagram illustrating an overview of a range of data as a target of search using a search window.

FIG. 2 is a diagram illustrating an overview of the range of data as the target of search using the search window.

The data as the target of search using the conventional search windows is of wide fields without being categorized at all. In contrast, the present service makes it possible to conduct a vertical search by narrowing down to a niche field such as a patent field, a legal field, etc. In addition, the present service allows the user corporation U to freely set the range of data as the target of search conducted via the search window C.

For example, the range of data as the target of search using the search window C may be limited to the data regarding patents owned by the user corporation U, the legal data (for example, precedents) held by the user corporation U. In this case, the data regarding the patents or the data regarding the legal issues as the target of search is extracted from a prescribed database where the data managed by the user corporation U is stored. The extracted data is stored in a prescribed data pool for each extraction condition. That is, the range of data that can be searched by using the search window C is the range of data stored in the data pools. Note here that the extraction conditions used when the data as the target of search is extracted is managed as the history information for each user corporation U. Accordingly, the user corporation U can analyze the data in-house based on the history information of the extraction conditions. For extraction of data, it is possible to use a method of copying (duplicating) the data of extraction source and saving it in the data pool or to use a method of streaming the data of extraction source. When the method of streaming is employed, there is such an advantage that storage capacity is not used.

Here, a case is assumed in which the content posted on the web page WP1 of FIG. 1 is related to the technology of the user corporation U. In this case, the user corporation U can limit the range of data as the target of search using the search window C to the data regarding the patents owned by the company itself, for example. Specifically, for example, when the user corporation U owns one hundred patents, only the data regarding the one hundred patents is set as the target of search via the search window C. In this case, on the web page WP, a guidance text B is displayed indicating that the range of data that can be searched via the search window C is limited to the patents owned by the user corporation U. Specifically, for example, as illustrated in FIG. 1, the guidance text B reading as "search of our patents" is displayed in the vicinity of the search window C.

Thus, the viewer of the web site WS can conduct a keyword search by using the search window C as appropriate, while viewing the information regarding the technologies of the user corporation U posted on the web page WP1. As a result, the viewer of the web site WS can efficiently acquire the information regarding the patents owned by the user corporation U without accessing the other web pages WP and other web sites WS.

Furthermore, as described above, the data as the target of search using the search window C is limited to the data that is independently managed by the user corporation U. Thus, for the sake of managing the web site WS, it is desired that the data capacity as the target of search does not increase. In this regard, according to the present service, the range of data as the target of search using the search window C is freely set for each search window C, so that the data capacity can be suppressed.

Note here that with the present service, the range of data as the target of search using the search window C is a private range that is limited to the data independently managed by each user corporation U. Therefore, the user corporation U can freely set the range of data as the target of search (for example, the information regarding the patents owned by the user corporation U) within the range of data held by the company itself (referred to as "user area" hereinafter). The user area is completely a private area, so that the risk of information leakage is reduced.

Furthermore, the present service further enables division of the user area. Thus, the user corporation U can divide the user area into a company level, a department level, an employee (individual) level, and the like. The division of the user area can be implemented in accordance with levels that are defined by an agreement such as a contract, a prescribed regulation, or the like, for example. When the user area is divided, each of the user subareas after the division becomes a completely private area. Therefore, there is no leakage of information between the user areas, thereby making it possible to prevent leakage of the trade secret or to protect privacy, for example. Specifically, for example, dividing the user area into subareas respectively associated with departments of a same corporation makes it possible to prevent the information held by each of the departments from being leaked among the departments. Furthermore, when the user area is divided into subareas, it is possible to freely set the range of data as the target of search via the search window C for each of the subareas. Specifically, for example, in a case where the web site WS is an in-house portal site, the range of data as the target of search can be set as "those not being laid open among the information regarding patent applications managed by the intellectual property department". Thus, the user corporation U can reduce the risk of leakage of technical information by the employees. For example, the range of data as the target of search can be set as "information not belonging to personal information among the information managed by the payroll manager". Thus, the user corporation U can protect personal information of the employees. Furthermore, the range of data as the target of search can be set in addition (as an afterthought) even after being set once. Furthermore, for example, even when the user area is divided, the history information of the search keywords and the search results of those who have used the search window C may be open to the public or distributed. That is, the history information of the search keywords input to the search window C and the search results have the utility value as the information indicating the preference and taste of those who have conducted the search, and such history information is also strictly managed for each of the divided user subareas. This makes it possible to protect the privacy of those who have conducted the search.

In summary, the present service is expected to provide the following effect, for example, in addition to the effect described above.

That is, the user corporation U may collect, for example, a large amount of data regarding the intellectual property (for example, publications, precedents, and the like) and set the collected data as the range of data that can be searched via the search window C. This also makes it possible to construct a large-scale database through which data of the intellectual property rights can be searched. Furthermore, it is possible to provide the data of appeal decisions and precedents regarding the intellectual property rights in accordance with the search result. Moreover, it is possible to view and download the original publications regarding the intellectual property rights.

Furthermore, the search result can be displayed at a high speed by using a prescribed algorithm. It is also possible to display the similarity rate between the search keywords and the intellectual property rights. Furthermore, it is no longer necessary to input a complicated search expression.

Although not illustrated, it is also possible to display the search result acquired through the search window on a UI (User Interface) having the following function, for example. That is, the search result can be displayed in a hyperdocument with which detailed information can be quickly checked. Furthermore, information indicating the state of patents being held and similar intellectual property rights thereof can be displayed on a single screen. Moreover, the content of other intellectual property rights that are owned by the intellectual property right owner can be grasped at a glance.

Furthermore, as a part of the present service, information regarding the search content, the results thereof, the use frequency and the like of the search window C is managed separately for each user corporation U. Also, the use of a fixed IP address makes it possible to limit connection. Furthermore, it becomes also possible to limit the connection ID and password.

In order to implement a patent search through a great number of cases, a greater system load is imposed in comparison with a general search. Also, the system cost is increased for providing the search results to an unspecified large number of user corporations U. The present service makes it possible to reduce the system cost by using a search engine different from the conventional configuration and also using a data generation method. Furthermore, in a case of a system-sharing type such as a cloud, there is the risk of leak of the information that is important for the patent strategy, such as the search history. In addition, when an independent system is to be prepared, the system cost will increase. It is possible to provide a mechanism capable of implementing the user areas not interfering with each other between corporations without requiring a plurality of systems, data, and the like for each of the corporations.

The history information of the search keywords and the search results via the search window C that is provided by the present service can be the target of machine learning using AI (Artificial Intelligence). Thus, the accuracy of the search results can be improved by continuation of the search.

Figure 3:
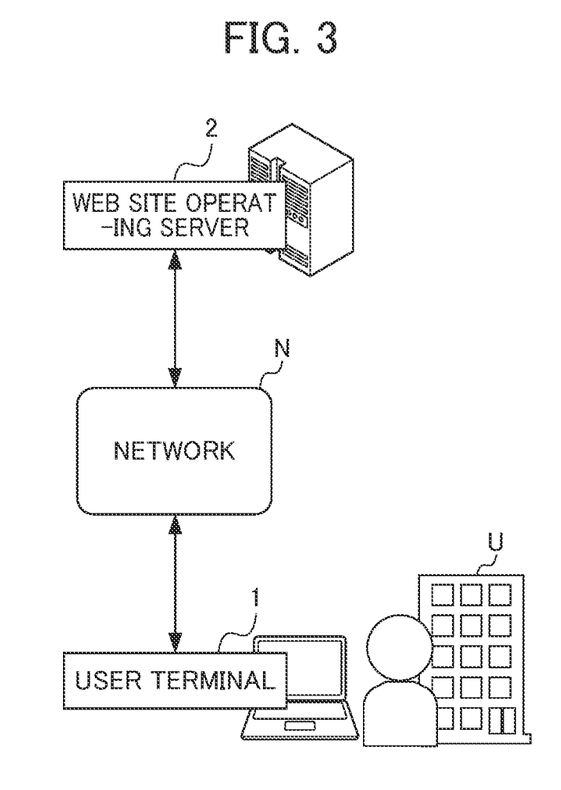
FIG. 3 is a diagram illustrating an example of a configuration of the information processing system according to the present invention.

Next, by referring to FIG. 3, the configuration of the information processing system for implementing the present service will be described. FIG. 3 is a diagram illustrating an example of the configuration of the information processing system according to the present invention.

The information processing system illustrated in FIG. 3 includes a user terminal 1 and a web site operating server 2. The user terminal 1 and the web site operating server 2 are mutually connected via a prescribed network N such as the Internet.

The user terminal 1 is an information processing device operated by the user corporation U. The user terminal 1 is constituted by a personal computer, a smartphone, a tablet, or the like, for example. The web site operating server 2 is an information processing device managed by the user (not illustrated) operating the web site WS. The web site operating server 2 provides the user corporation U with the environment where the user corporation U can create the web site WS by using the user terminal 1, while communicating with the user terminal 1 as appropriate.

In the user terminal 1, application software dedicated for the users of the present service (referred to as "dedicated app" hereinafter) is installed. The user corporation U can be provided with the present service by using the dedicated app. Furthermore, the user corporation U can also receive the present service by accessing a dedicated web site for the users of the present service (referred to as "dedicated site" hereinafter) displayed by a browser function of the user terminal 1. When expressed as "the user corporation U operates the user terminal 1" hereinafter, it means one of the followings unless otherwise noted. That is, it means that the user corporation U activates the dedicated app installed in the user terminal 1 and performs various kinds of operations, or uses the present service by accessing the dedicated site displayed by the browser function of the user terminal 1.

The user terminal 1 is not necessarily a dedicated device for using the present service. For example, the present service can be used by installing the dedicated app to a personal computer for office work placed in the user corporation U. Furthermore, for example, it is possible to use the present service by using the browser function of the personal computer for office work placed in the user corporation U.

Figure 4:
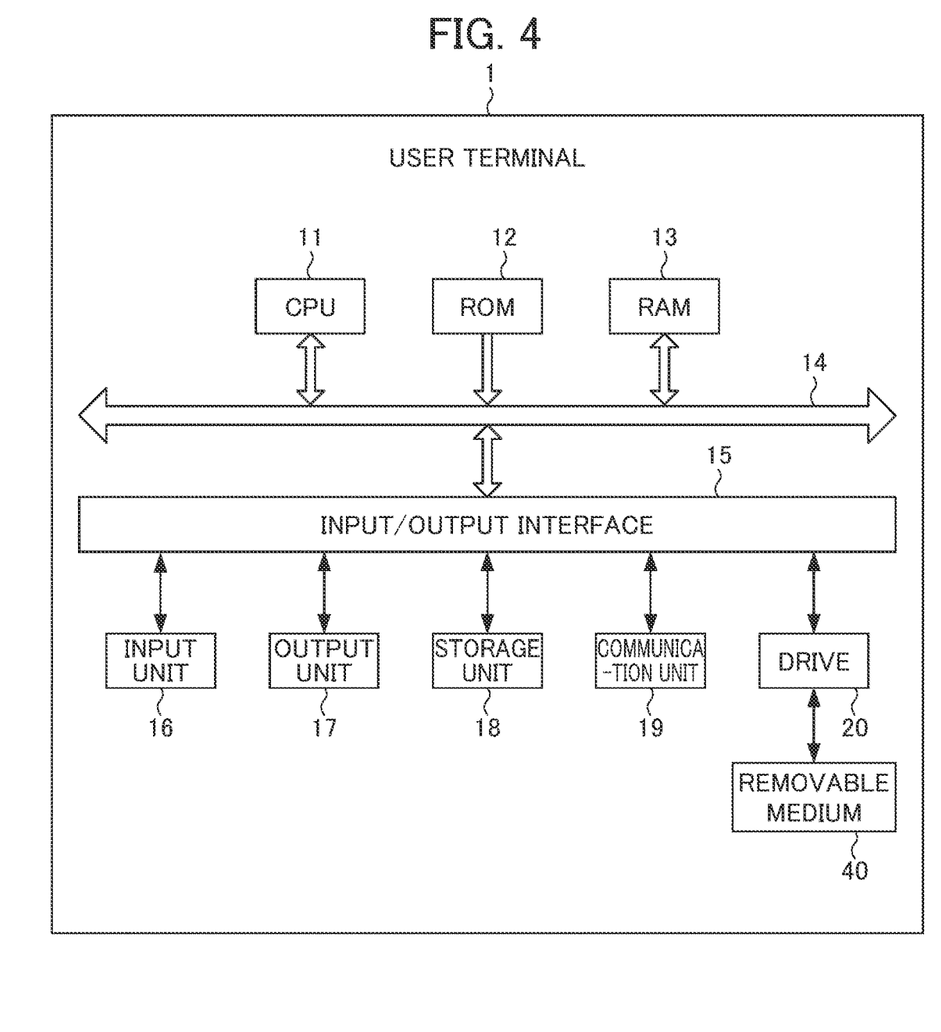
FIG. 4 is a block diagram illustrating an example of a hardware configuration of a user terminal in the information processing system illustrated in FIG. 3.

FIG. 4 is a block diagram illustrating an example of a hardware configuration of the user terminal in the information processing system illustrated in FIG. 3.

The user terminal 1 includes a CPU (Central Processing Unit) 11, a ROM (Read Only Memory) 12, a RAM (Random Access Memory) 13, a bus 14, an input/output interface 15, an input unit 16, an output unit 17, a storage unit 18, a communication unit 19, and a drive 20.

The CPU 11 executes various kinds of processing according to a program recorded in the ROM 12 or a program loaded into the RAM 13 from the storage unit 18. In the RAM 13, data and the like necessary for the CPU 11 to execute various kinds of processing are stored as appropriate.

The CPU 11, the ROM 12, and the RAM 13 are mutually connected via the bus 14. The input/output interface 15 is also connected to the bus 14. The input/output interface 15 is connected to the input unit 16, the output unit 17, the storage unit 18, the communication unit 19, and the drive 20.

The input unit 16 is constituted by a keyboard and the like, for example, for inputting various kinds of information. The output unit 17 is constituted by a display such as a liquid crystal display, a speaker, and the like for outputting various kinds of information as image and sound. The storage unit 18 is constituted by a DRAM (Dynamic Random Access Memory) and the like for storing various kinds of data. The communication unit 19 communicates with other devices (for example, the web site operating server 2 of FIG. 3 and the like) via the network N including the Internet.

To the drive 20, a removable medium 40 such as a magnetic disk, an optical disk, a magneto-optical disk, or a semiconductor memory is loaded as appropriate. The program read out from the removable medium 40 by the drive 20 is installed in the storage unit 18 as necessary. Furthermore, like the storage unit 18, the removable medium 40 can also store the various kinds of data stored in the storage unit 18.

Through such collaboration of various kinds of hardware and various kinds of software of the user terminal 1 illustrated in FIG. 3, it becomes possible to execute various kinds of processing including search window setting processing in the user terminal 1. As a result, the user corporation U can use the present service. Note that "search window setting processing" means the processing executed in the user terminal 1 for the present service to be provided. Hereinafter, by referring to FIG. 5, a functional configuration for executing the search window setting processing that is executed in the user terminal 1 according to the embodiment will be described.

Figure 5:
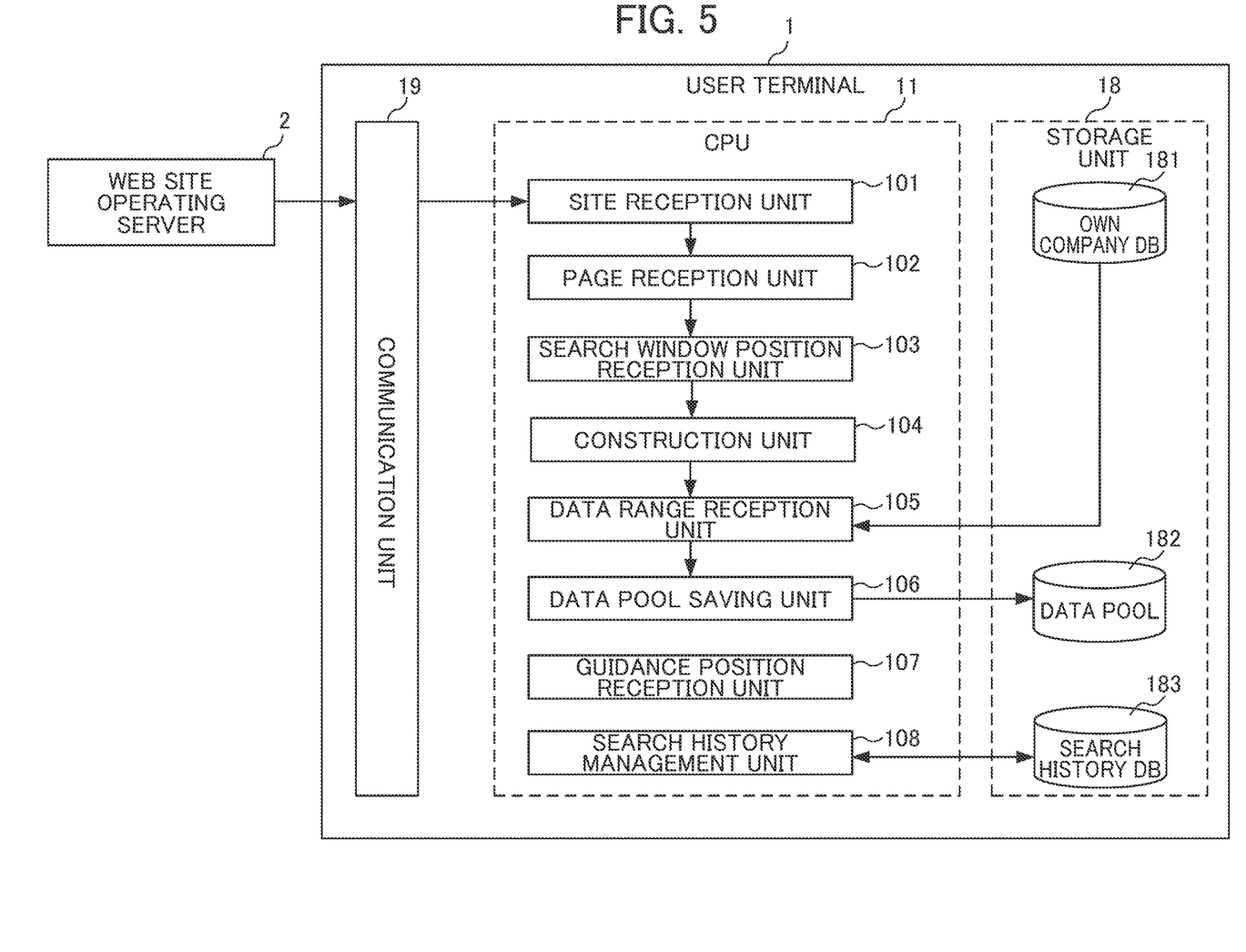
FIG. 5 is a block diagram illustrating an example of a functional configuration for executing search window setting processing, included in the functional configuration of the information processing system to which the user terminal of FIG. 4 is applied.

FIG. 5 is a block diagram illustrating an example of the functional configuration for executing the search window setting processing among the functional configuration of the information processing system to which the user terminal illustrated in FIG. 4 is applied.

As illustrated in FIG. 5, when execution of the search window setting processing is controlled, a site reception unit 101, a page reception unit 102, a search window position reception unit 103, a construction unit 104, a data range reception unit 105, a data pool saving unit 106, a guidance position reception unit 107, and a search history management unit 108 function in the CPU 11 of the user terminal 1. Furthermore, in one area of the storage unit 18 of the user terminal 1, an own company DB 181, a data pool 182, and a search history DB 183 are provided. In the own company DB 181, the data held independently by the user corporation U is stored and managed. In the data pool 182, one or more pieces of data extracted from the own company DB 181 are saved. In the search history DB 183, the input history of the search keywords input to the search window C is stored and managed as the history information.

The site reception unit 101 receives designation of the target web site WS where the search window C is to be displayed. Specifically, the site reception unit 101 receives the designation when the target web site WS where the search window C is to be displayed is designated by the user corporation U. When the designation is received by the site reception unit 101, the web site WS where the search window C is to be provided is determined.

The page reception unit 102 receives designation of one or more target web pages WP where the search window C is to be displayed, among the target web pages WP1 to WPn constituting the web site WS the designation of which is received by the site reception unit 101. Specifically, the page reception unit 102 receives the designation, when the target web page WP where the search window C is to be displayed is designated by the user corporation U. When the designation is received by the page reception unit 102, the web page WP where the search window C is to be provided is determined.

The search window position reception unit 103 receives designation of the position for displaying the search window C for each of the web pages WP the designation of which is received by the page reception unit 102. Specifically, the search window position reception unit 103 receives the designation when the position for displaying the search window C is designated by the user corporation U. When the designation is received by the search window position reception unit 103, the position on the web page WP where the search window C is to be provided is determined.

The construction unit 104 constructs the web site WS such that the search window C is displayed at the designated position to those who access the web site WS. Specifically, the construction unit 104 uses an HTML (Hypertext Markup Language) tag to perform programming such that the search window C is displayed on the web site WS.

The data range reception unit 105 receives designation of the range of data as the target of search for each search window C. Specifically, the data range reception unit 105 receives the designation, when the data regarding all patents owned by the user corporation U is designated by the user corporation U as the range of data as the target of search. When the designation is received by the data range reception unit 105, the range of data as the target of search is determined.

The data pool saving unit 106 extracts, from the own company DB 181, the data belonging to the range of data the designation of which is received by the data range reception unit 105, and saves it in the data pool constituted by one or more pieces of data. Specifically, the data pool saving unit 106 extracts the data regarding the patents owned by the user corporation U from the own company DB 181, and saves it in the data pool 182 constituted by a group of data regarding the patents held by the user corporation U. The data pool 182 is provided in one area of the storage unit 18.

The guidance position reception unit 107 receives designation of a position for further displaying a guidance that indicates the range of data as the target of search in the prescribed position of the web page WP where the search window C is displayed. Specifically, for example, the guidance position reception unit 107 executes control for displaying the guidance text B in the vicinity (above the search window C in the example illustrated in FIG. 1) of the search window C, which is easily recognized by the viewer of the web page WP.

The search history management unit 108 associates the input history of the search keywords input to the search window C with the information capable of uniquely identifying the inputter of the search keywords, and manages it as the history information. Specifically, the search history management unit 108 stores and manages the history information in the search history DB 183. The user corporation U can arbitrarily conceal the history information stored in the search history DB 183. Furthermore, the history information may be open to the public or distributed as valuable information. Furthermore, the search history management unit 108 asks the inputter whether to record the history of the search keywords input to the search window C as the history information. The search history management unit 108 executes the management not to record the history information of the inputter who refuses to record.

While one embodiment of the present invention is described above, the present invention is not limited to the above-described embodiment. It should be noted that various alterations, modifications, and the like within the scope of achieving the object of the present invention are to be included in the present invention.

For example, while the range of data as the target of search via the search window C is defined to be the data regarding all patents owned by the user corporation U in the above-described embodiment, this is merely a non-limiting example. For example, data belonging to various fields such as medical care and finance related to the user corporation U can be defined as the target of search. Furthermore, other than the data regarding all patents owned by the user corporation U, for example, data regarding all patents invented by an employee A of the user corporation U, for example, may be defined as the range of data. That is, when designating the range of data, it is also possible to determine the range of data as the target of search by designating the user area not only on the corporation level but also on the department level, individual level, or the like. Furthermore, the same user may be included in each of a plurality of user areas. Also, the user areas can be open to the public or considered as the subject of sale.

Furthermore, for example, while the present service in the above-described embodiment has been described as a service to be provided to the user corporation U that creates the web site WS, this is merely a non-limiting example. The present service may be provided not only to corporations but also to individuals, for example.

Furthermore, for example, the mode of the web site WS illustrated in FIG. 1 is merely a non-limiting example for describing the content of the present service. The user corporation U can create the web site WS in a mode different from the mode illustrated in FIG. 1.

Furthermore, for example, while the case of providing the search window C on the web site WS of the user corporation U is described in the embodiment described above, this is merely a non-limiting example. For example, the search window C may be provided on a corporation portal site used within the user corporation U. In this case, if the range of data that can be searched via the search window C provided on the corporation portal site indicates all patents owned by the user corporation U, for example, an employee of the user corporation U can search for the patents owned by the company itself at any time.

Furthermore, for example, while the data managed by the user corporation U is defined as the target of search in the embodiment described above, the target is not limited thereto. For example, it is also possible to provide API (Application Programming Interface) having a function of providing the search window C that can be linked to a patent search system provided separately. This makes it possible to reduce the number of steps and also to easily provide the search environment.

Furthermore, for example, only one user corporation U is illustrated in FIG. 3 for simplifying the explanation. In practice, however, there are naturally a large number of user corporations U (or individual users) that create the web sites WS.

Furthermore, while the search window C is provided on the web site WS in the embodiment described above, for example, the search window C may not necessarily be provided thereon but may be provided on a screen where application software is displayed, for example.

Furthermore, while the user who create the web site WS is the user corporation U in the embodiment described above, for example, it is not limited to this and a user complying with the intention of the user corporation U may create the web site WS, for example. Specifically, for example, a web design company or a provider of the present service may create the web site WS in accordance with the instructions of the user corporation U.

Furthermore, the system configuration illustrated in FIG. 3 and the hardware configuration of the user terminal 1 illustrated in FIG. 4 are both presented merely as non-limiting examples for achieving the object of the present invention, and there is no specific limit set thereto.

Furthermore, the functional block diagram illustrated in FIG. 5 is presented merely as a non-limiting example, and there is no specific limit set thereto. That is, the information processing system simply needs to be provided with the functions capable of executing the above-described series of processing as a whole, and the functional blocks to be used for implementing the functions is not specifically limited to the example illustrated in FIG. 5. For example, while the data pool 182 is provided in one area of the storage unit 18 in FIG. 5, it is not necessary to be provided when the method of streaming the data in the data extraction source (the own company DB 181) is employed.

Furthermore, the locations of the functional blocks are not limited to those illustrated in FIG. 5 but may be determined arbitrarily. For example, while the search window setting processing is executed in the user terminal 1 in the case of FIG. 5, it is not limited thereto. At least a part of the search window setting processing may be executed in the web site operating server 2 or in a server (not shown) that is separately managed by the provider that provides the present service. That is, while the functional blocks necessary for executing the search window setting processing are described to be provided to the user terminal 1, this is merely a non-limiting example. At least a part of the functional blocks disposed in the user terminal 1 may be provided to the web site operating server 2 or the server (not shown) that is separately managed by the provider that provides the present service.

Furthermore, the series of the processing described above may be executed by hardware or by software. Moreover, a single functional block may be constituted by hardware alone, may be constituted by software alone, or may be constituted by a combination of those.

When the series of the processing is executed by software, a program constituting the software is installed to a computer or the like from a network or a recording medium. The computer may be a computer mounted to dedicated hardware. Furthermore, the computer may be a computer capable of executing various kinds of functions by having various kinds of programs installed therein, such as a multipurpose smartphone or a personal computer other than a server, for example.

The recording medium including such programs is constituted not only by a removable medium (not shown), which is separately distributed from the device body for providing the programs to the advertiser but also constituted by a recording medium or the like distributed to the advertiser while being mounted in advance in the device body.

Note that in the present description, steps of writing the program to be recorded in the recording medium includes not only the processing executed in time series along the order thereof but also the processing that is not necessarily executed in time series but executed in parallel or individually. Furthermore, it is to be noted that the term "system" in the present description means a whole apparatus constituted by a plurality of devices, a plurality of pieces of means, and the like.

In summary, the information processing system to which the present invention is applied simply needs to employ a following configuration, and may employ various kinds of embodiments. That is, the information processing system to which the present invention is applied includes:

first reception unit (for example, the site reception unit 101 of FIG. 5) that receives designation of a target web site (for example, the web site WS of FIG. 1) where a search window (for example, the search window C of FIG. 1) for searching for data existing in a prescribed data pool (for example, a data group extracted from the own company DB 181 of FIG. 5) is to be displayed;

second reception unit (for example, the page reception unit 102 of FIG. 5) that receives designation of one or more target web pages for displaying the search window among one or more web pages (for example, the web pages WP1 to WPn of FIG. 1) constituting the web site the designation of which is received;

third reception unit (for example, the search window position reception unit 103 of FIG. 5) that receives designation of a position for displaying the search window for each of the one or more web pages the designation of which is received; and construction unit (for example, the construction unit 104 of FIG. 5) that constructs the web site such that the search window is displayed at the position for a person (for example, the viewer) accessing the web site.

Thus, the designation of the web site where the search window for searching for the data existing in the prescribed data pool is to be provided, the designation of the web page for displaying the search window, and the designation of the position on the web site for displaying the search window are received. Then, the search window is displayed at the position on the web page the designation of which is received. Then, the user displays the search window at a desired position of a desired web page that constitutes the web site created by the user oneself. As a result, it becomes possible to speculate what kind of persons will access the web site WS, and provide the search window C by designating the easily recognizable position on the web page WP that may be viewed by the speculated persons. Specifically, for example, there may be a case where the persons speculated to access are employees of a startup corporation planning to file an application for a new business model patent. Furthermore, there may also be a case where the persons may be those who are to acquire information regarding patent attorneys specialized in filing an application for a business model patent. In such cases, it is expected that the use frequency of the search window C by those who are speculated to access the web site WS will increase as described above, so that it is expected that the number of accesses to the web site where the search window C is provided will increase. Furthermore, when it starts to be generally recognized that the number of accesses fluctuates based on the presence or absence of the search window C or the position of the search window C, the existence value of the search window C itself is expected to increase gradually.

Furthermore, it is also possible to further provide fourth reception unit (for example, the guidance position reception unit 107 of FIG. 5) that receives designation of a position for further displaying a guidance indicating a range of data as a target of the search at a prescribed position of the web page where the search window is displayed.

Thereby, the guidance regarding the range of data that can be searched is displayed on the web page by inputting a search keyword in the search window. As a result, the convenience for the viewer of the web page can be increased.

Furthermore, it is also possible to further provide management unit (for example, the search history management unit 108 of FIG. 5) that: associates an input history of a search keyword input to the search window with information capable of uniquely identifying an inputter of the search keyword; and manages the associated information as history information.

Thus, the input history of the search keywords can be placed under management of the user. Therefore, the user can dominate handling of the history information of the search keywords, so that it becomes possible to release and democratize the history information.

EXPLANATION OF REFERENCE NUMERALS

1 User terminal, 2 Web site operating server, 11 CPU, 12 ROM, 13 RAM, 14 Bus, 15 Input/output interface, 16 Input unit, 17 Output unit, 18 Storage unit, 19 Communication unit, 20 Drive, 40 Removable medium, 101 Site reception unit, 102 Page reception unit, 103 Search window position reception unit, 104 Construction unit, 105 Data range reception unit, 106 Data pool saving unit, 107 Guidance position reception unit, 108 Search history management unit, 181 Own company DB, 182 Data pool, 183 Search history DB, U User corporation, WS Web site, WP, WP1 to WPn Web page, C Search window, B Guidance text, N Network It is claimed:

1. An information processing system for providing search results at a prescribed position on a prescribed web page by receiving as input a prescribed search keyword in a search window, the information processing system including a machine-readable medium having instructions stored thereon, which, when executed by a processor included in the system, cause the system to perform operations comprising:

receiving a first designation of a web site managed for a purpose other than search by a site manager from the site manager as a target web site where a search window for searching for data existing in a prescribed data pool is to be displayed;

receiving, from the site manager, a second designation of one or more target web pages for displaying the search window among one or more web pages constituting the web site specified in the first designation;

receiving, from the site manager, a third designation of a first position for displaying the search window for each of the one or more target web pages specified in the second designation;

receiving, from the site manager, fourth designation of a range of data existing in the prescribed data pool to be searched by the search window for each of the one or more target web pages specified in the second designation;

receiving, from the site manager, a fifth designation of a second position for displaying a guidance that indicates the range of data to be searched as specified in the fourth designation;

constructing the web site such that the search window is displayed at the first position and the guidance is displayed at the second position for a person accessing the web site, and determining, depending on an inputter of the search keyword whether to record an input history of a search keyword input to the search window and information of the inputter as associated information and managing the associated information as history information under management of the site manager, wherein in the prescribed data pool, limited data extracted from a prescribed database according to prescribed extraction conditions by the site manager is stored, wherein the guidance indicating a range of data corresponding to the limited data of the prescribed data pool is provided by the site manager, and wherein the constructing the web site includes employing a data pool in which the limited data controlled by the site manager exists as the prescribed data pool to allow searching using the data pool corresponding to the guidance in the search window.

2. The information processing system according to claim 1, wherein the operations further comprise: managing the prescribed extraction conditions for extracting the limited data as history information.

3. An information processing method executed by an information processing system for providing search results at a prescribed position on a prescribed web page by inputting a prescribed search keyword into a search window, comprising:

receiving a first designation of a web site managed for a purpose other than search by a site manager from the site manager as a target web site where a search window for searching for data existing in a prescribed data pool is to be displayed;

receiving, from the site manager, a second designation of one or more target web pages for displaying the search window among one or more web pages constituting the web site specified in the first designation;

receiving, from the site manager, a third designation of a first position for displaying the search window for each of the one or more target web pages specified in the second designation;

receiving, from the site manager, fourth designation of a range of data existing in the prescribed data pool to be searched by the search window for each of the one or more target web pages specified in the second designation;

receiving, from the site manager, a fifth designation of a second position for displaying a guidance that indicates the range of data to be searched as specified in the fourth designation;

constructing the web site such that the search window is displayed at the first position and the guidance is displayed at the second position for a person accessing the web site, and determining, depending on an inputter of the search keyword whether to record an input history of a search keyword input to the search window and information of the inputter as associated information and managing the associated information as history information under management of the site manager, wherein in the prescribed data pool, limited data extracted from a prescribed database according to prescribed extraction conditions by the site manager is stored, wherein the guidance indicating a range of data corresponding to the limited data of the prescribed data pool is provided by the site manager, and wherein the constructing the web site includes employing a data pool in which the limited data controlled by the site manager exists as the prescribed data pool to allow searching using the data pool corresponding to the guidance in the search window.

4. The information processing method according to claim 3, further comprising: managing the prescribed extraction conditions for extracting the limited data as history information.

5. A non-transitory computer readable medium storing a program that causes a computer to execute control processing for providing search results at a prescribed position on a prescribed web page by inputting a prescribed search keyword into a search window, the control processing comprising:

receiving a first designation of a web site managed for a purpose other than search by a site manager from the site manager as a target web site where a search window for searching for data existing in a prescribed data pool is to be displayed;

receiving, from the site manager, a second designation of one or more target web pages for displaying the search window among one or more web pages constituting the web site specified in the first designation;

receiving, from the site manager, a third designation of a first position for displaying the search window for each of the one or more target web pages specified in the second designation;

receiving, from the site manager, fourth designation of a range of data existing in the prescribed data pool to be searched by the search window for each of the one or more target web pages specified in the second designation;

receiving, from the site manager, a fifth designation of a second position for displaying a guidance that indicates the range of data to be searched as specified in the fourth designation;

constructing the web site such that the search window is displayed at the first position and the guidance is displayed at the second position for a person accessing the web site, and determining, depending on an inputter of the search keyword whether to record an input history of a search keyword input to the search window and information of the inputter as associated information and managing the associated information as history information under management of the site manager, wherein in the prescribed data pool, limited data extracted from a prescribed database according to prescribed extraction conditions by the site manager is stored, wherein the guidance indicating a range of data corresponding to the limited data of the prescribed data pool is provided by the site manager, and wherein the constructing the web site includes employing a data pool in which the limited data controlled by the site manager exists as the prescribed data pool to allow searching using the data pool corresponding to the guidance in the search window.

6. The non-transitory computer readable medium according to claim 5, wherein the control processing further comprises: managing the prescribed extraction conditions for extracting the limited data as history information.

* * * * *